United States Patent Office 3,192,030
Patented June 29, 1965

3,192,030
FERTILIZER EMULSIONS
Ivor W. Mills, Glenolden, and John J. Melchiore, Wallingford, Pa., assignors to Sun Oil Company, Philadelphia, Pa., a corporation of New Jersey
No Drawing. Filed Oct. 4, 1962, Ser. No. 228,260
6 Claims. (Cl. 71—11)

This invention relates to emulsions which contain, inter alia, a fertilizer compound and wax. The invention further embraces the fertilization of soil with such emulsions.

Nitrogen, potassium, and phosphorous are essential elements for plant growth and commercially available fertilizers for promotion of plant growth invariably contain an organic or inorganic compound containing one or more of these elements. Some of the more frequently used compounds are ammonium nitrate, urea, ammonium sulfate, sodium nitrate, potassium nitrate, potash, ammonium phosphate, and mixtures thereof.

Unfortunately, most of the compounds used in commercial fertilizers are readily water-soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. In addition, the readily soluble compounds often become available too rapidly to the plant resulting in injury to the plant rather than benefit. This is often noticed in "burned" lawns.

One method of reducing the rate at which the fertilizer is consumed by the plants and the rate at which the fertilizer is carried away by rainwater is to coat the fertilizer particles with wax. In a copending application (S.N. 209,790, filed July 13, 1962), the improved water resistance of a wax coated fertilizer has been disclosed.

A convenient method of treating soil with a wax coated fertilizer comprises forming wax coated fertilizer particles and then distributing the coated fertilizer particles over the surface of the soil by means of conventional fertilizer spreading equipment. The wax coated fertilizer particles can be prepared by any of several methods. One method it to form a slurry of fertilizer in molten wax and then shape the slurry into pellets by means of a mold and allow the pellets to cool. The resulting solid pellets are essentially fertilizer coated with wax.

The use of wax coated fertilizer particles has a disadvantage, however, in that additional equipment is required in order to apply the wax coating to the fertilizer particles. This additional equipment may take the form of, as described above, a pellet mold. We have now discovered compositions which, upon application to soil, form wax coated fertilizer particles, and which thereby eliminate the need for forming coated fertilizer particles prior to application to the soil. The compositions of the invention comprise emulsions, in each of which the dispersed phase is wax dissolved in a volatile organic solvent and the continuous phase is a water solution of a solid fertilizer compound. When the emulsion is applied to the soil by, for example, spraying, the water and volatile organic solvent evaporate leaving the soil covered with a thin film of wax containing fertilizer particles dispersed therein.

As stated above, the compositions of the invention are emulsions. Any emulsion contains a continuous phase and a discontinuous or dispersed phase with the dispersion of the one phase in the other being usually effected by the use of an emulsifying agent. The continuous phase of the emulsions of the invention is a water solution of a solid fertilizer compound. The fertilizer compound can be organic or inorganic but it must be solid at ambient temperatures and water-soluble. The fertilizers described hereinbefore as in frequent use are examples of the fertilizers suitable for the present purpose. The amount of fertilizer compound in the emulsion will be described in more detail hereinafter.

The dispersed phase of the emulsions of the invention is a solution of wax in a volatile organic solvent. A variety of waxes can be used. Particularly suitable waxes are those derived from petroleum, either paraffin or microcrystalline. Such paraffin waxes will usually have melting points in the range of 110° to 165° F. (ASTM D-87), viscosities in the range of 30–50 S.U.S. at 210° F. (ASTM D-446), and penetrations in the range of 5–25 dmm. at 77° F. (ASTM D-1321, 100 gms., 5 sec.) The microcrystalline waxes will usually have a melting point in the range of 140° to 210° F. (ASTM D-127), viscosities in the range of 60–100 S.U.S. at 210° F. (ASTM D-446), and penetrations in the range of 5–25 dmm. at 77° F. (ASTM D-1321, 100 gms., 5 sec.). Although they are less preferable, natural waxes of the animal, vegetable, or mineral types can also be used, either alone or as mixtures with petroleum waxes. Examples of such natural waxes are beeswax, montan wax, candelilla wax, spermaceti wax, ozocerite wax, and carnauba wax.

A variety of volatile organic solvents can be used. The solvents are volatile in that they will evaporate within a relatively short time after the emulsion is applied to the soil. The solvents should be, of course, immiscible with water. Preferred volatile organic solvents are the hydrocarbon solvents obtained from petroleum and traditionally known as mineral spirits. These solvents generally boil within the range of 300° to 500° F. Other volatile organic solvents which can be used are benzene, toluene, carbon tetrachloride, ethylene dichloride, and the like, but these solvents are not, for economic reasons, as desirable as mineral spirits.

An extremely large number of agents which will emulsify wax in water are known to those skilled in the art, and these emulsifying agents can also be used to emulsify a volatile organic solvent solution of wax in a water solution of a fertilizer compound. Such emulsifying agents can be of the cationic, anionic, or nonionic types. Typical of the emulsifying agents which can be used are polyoxyethylene esters of fatty acids, polyoxyethylene glycol esters of fatty acids, polyoxyethylene sorbitan esters of fatty acids, propylene glycol esters of fatty acids, alkyl aryl polyether alcohols, organic phosphate esters, salts of alkyl aryl sulfonates, salts of fatty alcohol sulfates, alkyl aryl polyether sulfonates, sarcosinate salts, protein condensates, fatty acid amines, fatty amine condensates, amine salts of sulfonic acids, esters of sodium sulfosuccinic acid, and the like.

The purpose of each ingredient of the emulsions of the invention should be noted. The fertilizer compound is, of course, the desired plant food. The water dissolves the fertilizer and thereby places the fertilizer in a form in which it can serve, along with the water, as the continuous phase of an emulsion. The wax is a water resistant coating material which, when it surrounds the fertilizer particles, reduces the leaching of such particles by water. The purpose of the volatile organic solvent is to form a continuous film of wax on the surface of soil when the emulsion is applied to the soil. If an emulsion containing no solvent is applied to the soil, i.e., if an emulsion of wax in a water solution of a fertilizer is applied to the soil, subsequent evaporation of the water leaves essentially only distinct particles of fertilizer and distinct particles of wax. The result is essentially equivalent to spreading a mixture of solid fertilizer particles and solid wax particles on the soil. There is little improvement in the water resistance of the fertilizer because essentially all of the fertilizer is only mixed with wax and is not coated with wax. When, however, the wax is in the emulsion is in solution in a volatile organic solvent, a different result is obtained. Now when the emulsion is applied to the soil, a thin, continuous film of wax solution covers the soil and coats the fertilizer particles. Upon subsequent evaporation of the water and solvent the fertilizer particles remaining are dispersed in a solid continuous film of wax.

The amount of each ingredient in the emulsion compositions of the invention can vary over relatively wide ranges and is best understood by visualizing the emulsions of the invention as being obtained by adding a solid fertilizer compound to an emulsion of a volatile organic solvent solution of wax in water. As will be seen hereinafter this is, in fact, one method of preparing the emulsions of the invention. Fertilizer can be added to any emulsion of a volatile organic solvent solution of wax in water in any amount up to saturation of the water. However, the water resistance of the coated fertilizer in the soil is mainly determined by the ratio of wax to fertilizer, with increasing ratios of wax to fertilizer resulting in increasing water resistance. In areas of relatively heavy rainfall it will be desirable to have a relatively high ratio of wax to fertilizer. In areas of relatively dry climate, relatively low wax to fertilizer ratios will usually be used. It will be found that emulsions containing a wax to fertilizer ratio in the range of 0.2:1 to 1.5:1 will provide coated fertilizers having varying water resistance suitable for a variety of use conditions. Thus the emulsion compositions of the invention include emulsions of a volatile organic solvent solution of wax in water, the water having dissolved therein a solid fertilizer compound, and the ratio of wax to fertilizer being in the range of 0.2:1 to 1.5:1. The preferred compositions of the invention are visualized as being obtained by adding fertilizer to an emulsion of a volatile organic solvent solution of wax in water having the following composition. All percentages, parts, and ratios in this specification are on a weight basis.

| | |
|---|---|
| Wax | percent 20–60 |
| Water | do 20–60 |
| Volatile organic solvent | do 5–25 |
| Emulsifying agent | (¹) |

¹ Sufficient to cause emulsification, generally 1–10%.

The amount of fertilizer added to such an emulsion will, as described previously, be limited by the water solubility of the fertilizer. The most soluble of the commercially available fertilizers is ammonium nitrate which has a solubility of approximately 250 parts per 100 parts of water at 30° C. In addition, the amount of fertilizer should be such that the ratio of wax to fertilizer is in the range of 0.2:1 to 1.5:1. Thus the emulsion composition presented above becomes, after addition of fertilizer,

| | |
|---|---|
| Fertilizer | parts 13–150 |
| Wax | do 20–60 |
| Water | do 20–60 |
| Volatile organic solvent | do 5–25 |
| Emulsifying agent | (¹) |
| Wax to fertilizer ratio | 0.2:1 to 1.5:1 |

¹ Sufficient to cause emulsification, generally 1–10 parts.

Within the above specified ranges the amount of water used must be sufficient to dissolve the fertilizer and the amount of solvent used must be sufficient to dissolve the wax. The former will depend upon the particular fertilizer used, while the latter will depend upon the particular solvent used and, to a lesser extent, upon the particular wax used.

The emulsions of the invention can be formed in conventional equipment according to conventional emulsion preparation techniques. For example, the fertilizer is dissolved in the water in a mixing tank and the emulsifying agent is then added to the solution. The wax is dissolved in the volatile organic solvent and the wax solution is then added to the tank with vigorous agitation. Agitation is continued until emulsification occurs, which can be detected by the milky, homogeneous appearance of the product. Alternatively, an emulsion of the wax solution in water can be prepared and the fertilizer then mixed with such emulsion. The fertilizer readily dissolves in the water phase of emulsion. In preparing any wax emulsions and also the fertilizer emulsions of the invention, emulsification occurs more rapidly if done at an elevated temperature, e.g., 150° to 200° F.

The fertilizer emulsions of the invention are most conveniently applied to the soil by spraying. If desired, however, other methods of application such as sprinkling and the like can be used.

The following example illustrates the invention more specifically.

*Example*

45 parts of wax were dissolved in 13 parts of mineral spirits. The wax was a petroleum paraffin wax having a melting point of 126° F. (ASTM D–87), a penetration of 18 dmm. at 77° F. and 105 dmm. at 100° F. (ASTM D–1321, 100 gms., 5 sec.), and a viscosity of 38 S.U.S. at 210° F. (ASTM D–446). The solution was heated to 160° F. Next 5.0 parts of emulsifying agent were added to 37 parts of water maintained at 160° F. The 5.0 parts of emulsifying agent consisted of 2.5 parts of sorbitan monostearate (known commercially as "Span 60") and 2.5 parts of polyoxyethylene sorbitan monostearate (known commercially as "Tween 60"). The water was then added to the wax with vigorous agitation. Agitation was continued until emulsification occurred. The resulting emulsion had the following composition:

| | Percent |
|---|---|
| Wax | 45 |
| Mineral spirits | 13 |
| Water | 37 |
| Emulsifying agent | 5 |

Finally, 41 parts of urea were added with agitation to the entire quantity of the above emulsion. After a few minutes the urea had dissolved in the water. The composition of the final fertilizer emulsion thus was as follows:

| | |
|---|---|
| Fertilizer | parts 41 |
| Wax | do 45 |
| Mineral spirits | do 13 |
| Water | do 37 |
| Urea | do 41 |
| Emulsifying agent | do 5 |
| Wax to fertilizer ratio | 1.1 |

The above fertilizer emulsion could be sprayed, sprinkled, poured, etc., onto soil.

When the amount of the emulsion ingredients are varied within the limits specified hereinbefore substantially the same results are obtained. Likewise, when other solid water soluble fertilizers and other solvents and waxes of the types described hereinbefore are used, substantially the same results are obtained.

We claim:

1. An emulsion composition comprising (1) water as the continuous phase, (2) a volatile organic solvent substantially immiscible with water as the dispersed phase, and (3) an emulsifying agent capable of stabilizing a dispersion of said organic solvent in water, said water having dissolved therein a solid fertilizer compound, said solvent having dissolved therein a wax, and the ratio of said wax to said fertilizer being in the range of 0.2:1 to 1.5:1.

2. Composition according to claim 1 wherein the amount of water is 20–60 parts, the amount of wax is 20–60 parts, the amount of solvent is 5–25 parts, and the amount of fertilizer is 13–150 parts.

3. Composition according to claim 2 wherein said fertilizer is urea.

4. Composition according to claim 2 wherein said wax is a petroleum wax having a melting point in the range of 100° to 210° F., a penetration at 77° F. in the range of 5 to 25 dmm., and a viscosity at 210° F. in the range of 30–100 S.U.S.

5. Composition according to claim 2 wherein said solvent is mineral spirits.

6. Composition according to claim 1 wherein said fertilizer compound is selected from the group consisting of ammonium nitrate, urea, ammonium sulfate, sodium nitrate, potassium nitrate, potash, ammonium phosphate, and mixtures thereof.

References Cited by the Examiner
UNITED STATES PATENTS

| | | | |
|---|---|---|---|
| 1,882,377 | 10/32 | Whittelsey | 47—9 |
| 1,914,903 | 6/33 | Volck. | |
| 1,967,220 | 7/34 | Barrett et al. | 252—311.5 |
| 2,013,272 | 9/35 | Johnson. | |
| 2,019,758 | 11/35 | MacRill | 252—311.5 |
| 2,070,936 | 2/37 | Trowbridge | 252—311.5 |
| 2,936,226 | 5/60 | Kaufmann et al. | 71—1 |

FOREIGN PATENTS 663,725  12/51  Great Britain.

DONALL H. SYLVESTER, *Primary Examiner.*
ANTHONY SCIAMANNA, *Examiner.*